(12) United States Patent
Brown Elliott

(10) Patent No.: US 9,494,823 B2
(45) Date of Patent: Nov. 15, 2016

(54) METHOD AND APPARATUS FOR ACHIEVING UNIFORM HIGH LOCALITY LIGHT

(75) Inventor: Candice Hellen Brown Elliott, Santa Rosa, CA (US)

(73) Assignee: Samsung Display Co., Ltd. (KR)

( * ) Notice: Subject to any disclaimer, the term of this patent is extended or adjusted under 35 U.S.C. 154(b) by 768 days.

(21) Appl. No.: 13/547,986

(22) Filed: Jul. 12, 2012

(65) Prior Publication Data

US 2014/0016301 A1    Jan. 16, 2014

(51) Int. Cl.
*G02F 1/133* (2006.01)
*G02F 1/1335* (2006.01)
*G09G 3/34* (2006.01)

(52) U.S. Cl.
CPC ... *G02F 1/133603* (2013.01); *G02F 1/133606* (2013.01); *G09G 3/3426* (2013.01); *G02F 2001/133601* (2013.01); *G09G 2320/0209* (2013.01); *G09G 2320/0233* (2013.01); *G09G 2320/062* (2013.01); *G09G 2320/0646* (2013.01); *G09G 2340/0457* (2013.01)

(58) Field of Classification Search
CPC ....... G02F 1/133602–1/133606; G02F 1/609; G02F 2001/133601; G09G 3/3426; G09G 2340/0457; G09G 2320/0233
See application file for complete search history.

(56) References Cited

U.S. PATENT DOCUMENTS

| | | | |
|---|---|---|---|
| 2002/0024808 A1* | 2/2002 | Suehiro | G09F 9/33 362/245 |
| 2007/0052662 A1* | 3/2007 | Kim et al. | 345/102 |
| 2007/0070625 A1* | 3/2007 | Bang | 362/240 |

* cited by examiner

*Primary Examiner* — Thomas M Sember
(74) *Attorney, Agent, or Firm* — Innovation Counsel LLP

(57) ABSTRACT

A method and apparatus for effectively controlling light propagation are presented. The apparatus includes a muntin having reflective walls arranged to form a plurality of openings, and a cavity sheet disposed on the muntin. The muntin is configured to assemble with an array of light sources. The cavity sheet has a plurality of pinholes and is configured to assemble with the muntin such that the reflective walls align with areas between the pinholes. The light sources, the muntin, and the cavity sheet form light mixing cavities and light sources within each light mixing cavities may be individually controlled. The light mixing cavities allow generation of localized and uniform light.

13 Claims, 15 Drawing Sheets

FOCAL POINT
("VERTEX")

METHOD AND APPARATUS FOR ACHIEVING UNIFORM HIGH LOCALITY LIGHT

FIELD OF INVENTION

This invention is related generally to a display device and particularly to a display device that incorporates a backlight unit.

BACKGROUND

A backlight unit is often used as a light source for display devices such as Liquid Crystal Display (LCD) devices. Illumination level of the backlight can be adjusted low or high. For a high image quality, it is desirable to set the illumination level high (e.g., at the maximum) because setting the illumination level too low adversely affects the display quality, for example by creating visual artifacts. On the other hand, as display sizes increase and devices become more portable, power conservation concerns become increasingly important. While significant power conservation would be achieved by reducing the illumination level, for example by setting the illumination level at 50% of the maximum, the images would have visual error and noticeable artifacts (e.g., in areas of bright saturated color) with a illumination level that low.

Different methods have been developed to optimize the illumination level by balancing the image quality concerns with the power conservation goals, one of which is to dynamically adjust the illumination level as image is displayed. Today, some display panel systems utilize some form of this Dynamic Backlight Control (DBLC) to display a high-quality image at lower power usage.

Localized color dimming, whereby the backlight unit is divided into subsections that are individually controlled, works well with localized and uniform light zones. However, creating high locality and uniformity using traditional backlight designs is challenging; typically, the higher the locality, the lower the uniformity. With a traditional backlight, uniformity was achieved by situating the light sources such that the light could spread as far and wide as possible. The spreading of light, however, is not helpful when subsections of the backlight unit are controlled separately and individually because light from one subsection interferes with achieving the optimal luminance level of another subsection.

To more effectively practice localized dimming, a method and apparatus for simultaneously achieving high locality and uniformity is desired.

SUMMARY

In one aspect, the invention is an apparatus for controlling light propagation. The apparatus includes a muntin including reflective walls arranged to form a plurality of openings, and a cavity sheet disposed on the muntin. The muntin is configured to assemble with an array of light sources. The cavity sheet has a plurality of pinholes and is configured to assemble with the muntin such that the reflective walls align with areas between the pinholes.

In another aspect, the invention is a backlight unit that includes a light source module and a muntin on the light source module. The light source module includes light sources disposed on a substrate. The muntin includes reflective walls arranged to form a plurality of openings. Light sources align with the openings.

In yet another aspect, the invention is a backlight unit including a plurality of light mixing cavities wherein each of the light mixing cavities includes a light source surrounded by a reflective wall and a ceiling placed on the reflective wall, the ceiling having pinholes through which light exits.

In yet another aspect, the invention is a display device that includes a light source module having a substrate and a plurality of light sources, a muntin on the light source module, a cavity sheet on the muntin, optical sheets placed on the cavity sheet, and a display panel placed on the optical sheets. The muntin has reflective walls that surround the light sources to form discrete zones and the light sources in the discrete zones are controlled separately from other zones. The cavity sheet covers the zones to form light mixing cavities, and has pinholes through which light exits.

In yet another aspect, the invention is a method of operating a backlight unit. The method entails forming a plurality of light mixing cavities, each of the light mixing cavities including at least one light source surrounded by a reflective wall and a ceiling with holes. A preliminary illumination level for each of the light mixing cavities is determined based on image data. The preliminary illumination level for each of the light mixing cavities is adjusted by factoring in illumination level of a neighboring light mixing cavity.

DETAILED DESCRIPTION

Typically, simultaneously achieving high locality and uniformity has been a challenge because as one gets higher, the other tends to decrease. The invention uses localized light-mixing cavities to achieve improved light locality and light uniformity in a backlight unit. In some sense, each light-mixing cavity acts as a virtual light source that supplies light to the optical sheets and ultimately to the display panel. Although the invention is herein described in the context of Dynamic Backlight Control (DBLC) and localized dimming, it should be understood that these are not limitations of the invention and the disclosure may be adapted for embodiments that are not accompanied by DBLC and localized dimming.

The techniques described herein may be used with a traditional RGB system or a multiprimary system that has four or more non-coincident color primaries.

Figure 1:
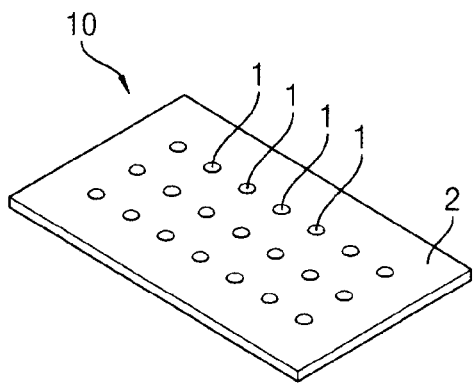
FIG. 1 is an example of a light source module that may be used for illumination in a display device.

FIG. 1 is an example of a light source module 10 that may be used for illumination in a display device. The light source module 10 includes a substrate 2 having a plurality of light sources 1 mounted thereon. The light sources 1 are arranged on the substrate 2 in a preselected configuration. The surface of the substrate 2 between the light sources 1 may be coated with a reflective material to direct light upward, toward the front of the display device. While the embodiment of FIG. 1 shows the light sources 1 arranged singularly, they may also be arranged in "clusters" such that a plurality of light sources 1 are grouped together in designated locations.

Although the description is provided in the context of light sources 1 being light emitting diodes (LEDs), this is for convenience and light sources 1 are not limited to being LEDs.

Figure 2:
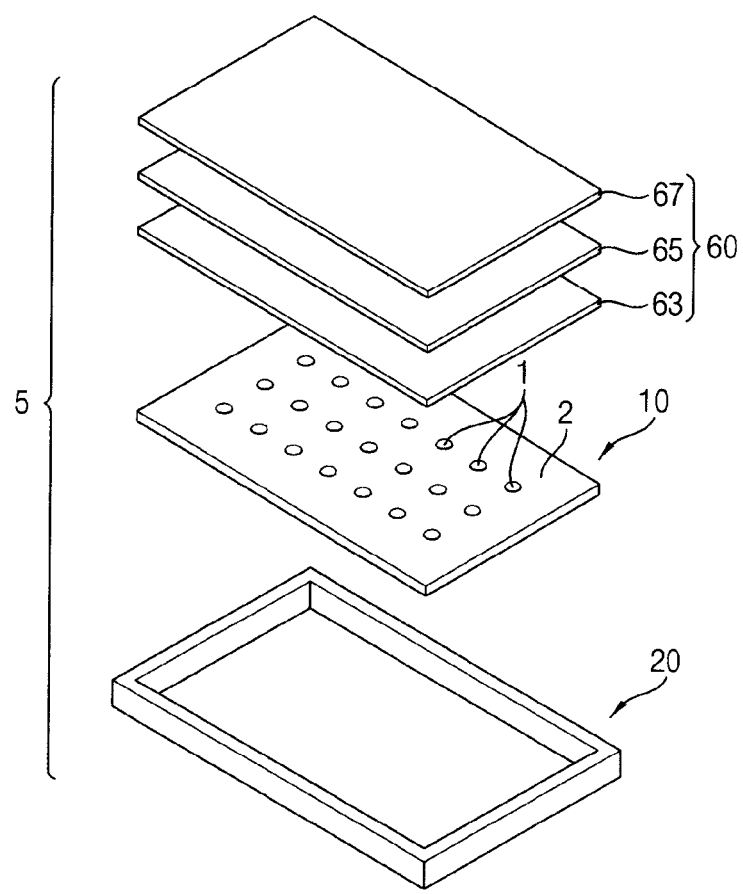
FIG. 2 is an exploded perspective view of a backlight unit that includes the light source module.

FIG. 2 is an exploded perspective view of a backlight unit 5 that includes the light source module 10. The backlight unit 5 has a receiving container 20 that receives the light source module 10 along with various optical sheets 60 that enhance optical characteristics of the light generated by the light sources 1. The optical sheets 60 may include a light recycling sheet 63, such as a commercially available Dual Brightness Enhancement Film (DBEF) marketed by 3M. DBEF is a multilayer, reflective polarizer that may selectively recycle light of certain polarization. A diffusion sheet 65 diffuses the light to enhance overall luminance uniformity, and a light condensing sheet 67 adjust the paths of light traveling toward the front (where the display panel is), such that light travels at an angle that is approximately normal to the display panel (not shown) that would be placed above the optical sheets 60. A display panel may be, for example, an active matrix LCD panel with pixels that may be individually turned on and off. A "pixel," as used herein, is a unit that depicts part of an image.

Different methods have been developed to optimize the illumination level by taking into consideration image quality concerns and power conservation goals. Dynamic Backlight Control (DBLC), whereby the illumination level is not maintained at a constant level but dynamically adjusted to the optimal level for the image that is displayed, is one way of optimizing the illumination level. A variation of DBLC incorporates local dimming, whereby a backlight is divided into multiple subsections and each subsection is dynamically controlled separately from other subsections. With local dimming, the backlight unit is divided into a number of subsections and the brightness level of each subsection is optimized individually. For example, if a cave exploration scene is being displayed whereby explorers are walking through a dark cave holding a flashlight, the brightness level of the subsections that show the flashlight or the light coming out of the flashlight will be adjusted to a higher level than that of the other subsections. Local dimming contributes to power savings by avoiding having to brighten spots that do not need to receive high brightness to properly display its portion of the image.

Figure 3:
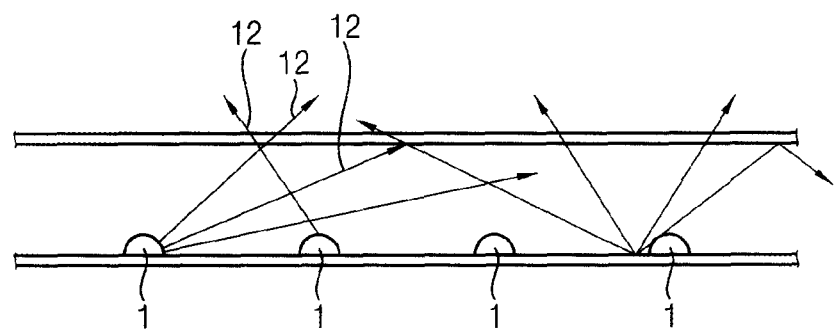
FIG. 3 is a side view of the light source module that illustrates propagation of light emitted by a light source.

One of the challenges in determining the optimal brightness level of each subsection stems from the fact that light, due to its natural properties, does not stay localized within each subsection. FIG. 3, which is a side view of the light source module 10, illustrates propagation of light emitted by a light source 1. When light source 1 emits light, light spreads as shown by the arrows 12. Due to the spreading of light, light can reach all the way across the light source module 10. Thus, in calculating how brightly to turn on the light source 1 for one subsection, the amount of light that is received from its neighboring subsections is taken into account. The more light is received from the neighboring subsections, the less light needs to be emitted by the light sources in that subsection to achieve the desired level of brightness. A subsection adjacent to a brightly lit subsection would be able to achieve the desired brightness with a lower illumination level because it would benefit from the light that leaks from the neighboring subsection. The illumination level determination is further complicated by the fact that the amount of light emitted in each of the neighboring subsections is dynamically changing as the images change.

The embodiments disclosed herein attempt to localize and "contain" the light within each subsection. Controlling the amount of spreading of light makes it easier to determine the optimal brightness level that should be assigned to each subsection.

Figure 4:
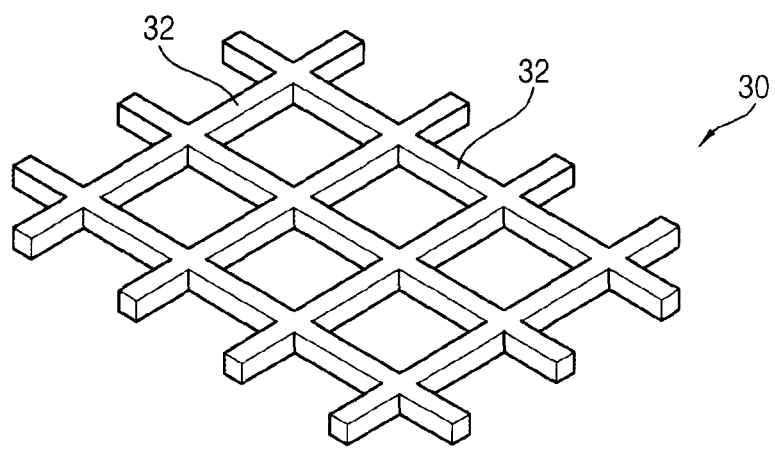
FIG. 4 is a perspective view of a muntin in accordance with one embodiment of the invention.

FIG. 4 is a perspective view of a muntin 30 in accordance with one embodiment of the invention. In the embodiment shown, the muntin 30 is a grid-shaped frame that is configured to be placed on the light source module 10. Walls 32 of the muntin 30 physically divide the light source module 10 into subsections, herein called "zones." In the embodiment of FIG. 4, the zones are rectangular in shape.

The muntin 30 is a frame wherein reflective walls 32 form multiple openings. The muntin 30 may be made of white plastic sheets. If the reflective walls 32 are too thick, it may cause a shadow in the image. On the other hand, if the reflective walls 32 are too thin, it may not contain the light well enough. The thickness of the reflective wall 32, therefore, is optimized depending on the size of the light source module 10, the number and brightness of the light sources 1 in each zone, the number and size of zones, etc.

Figure 5:
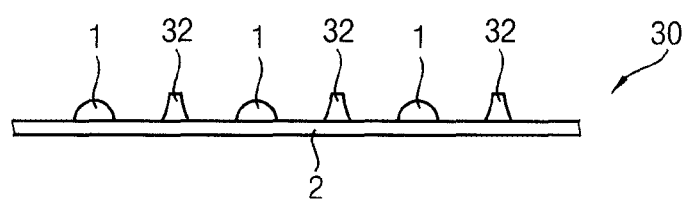
FIG. 5 and FIG. 6 are cross-sectional side views of the muntin placed on top of the substrate for different embodiments.

FIG. 5 is a cross-sectional side view of the muntin 30 placed on top of the substrate 2. In this embodiment, the reflective walls 32 of the muntin 30 are sloped to generally direct reflected light in the desired direction. The slope of the reflective walls 32 may be constant, as shown. The slope of the reflective wall 32 would be optimized, for example to reflect maximum amount of light in the desired direction. The distance between the light source 1 and the reflective walls 32 would also be optimized, taking into factors such as cost efficiency and optimal light mixing.

Figure 6:
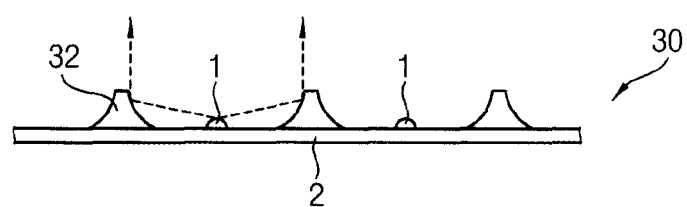

FIG. 6, which is a cross-sectional side view of an alternative embodiment, shows the reflective walls 32 having a non-constant slope, such that the walls are curved. As shown by the broken lines, light from the light source 1 strikes the curved wall and propagates upward, toward the optical sheets 60. The curvature may be set to maximize or optimize the amount of light that reaches the display panel. The reflective walls 32 may be a selected mixture of Lambertian and specular nature, combined with imaging mirror and muntin-like partitions. The curvature of the reflective wall 32 is designed like an imaging mirror, perhaps a paraboloid, to direct light in parallel rays to the optical sheets 60 (shown in FIG. 2). Light penetrates into the bulk of the white reflector material that forms the muntin walls 32, and is Lambertian-reflected back across the local zone. If a polarizing light recycling film is the first sheet of the optical sheets 60 that the reflected light encounters, the reflected image may be recycled back onto the substrate 2.

One advantage of such an imaging light recycling system is that it may maintain a greater locality than a non-imaging, purely Lambertian reflector muntin system. Various amounts of specular vs. Lambertian reflection may be modeled to determine the best trade-off between locality and uniformity. A full matrix or MonteCarlo simulation of all the variables may be performed.

Figure 7:
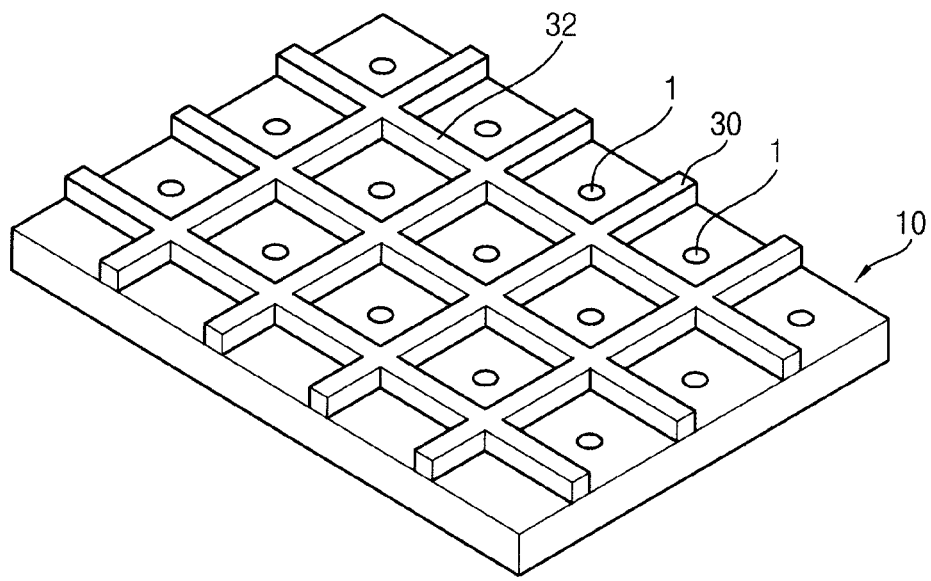
FIG. 7 shows the muntin placed on the light source module in accordance with an embodiment of the invention.
Figure 8:
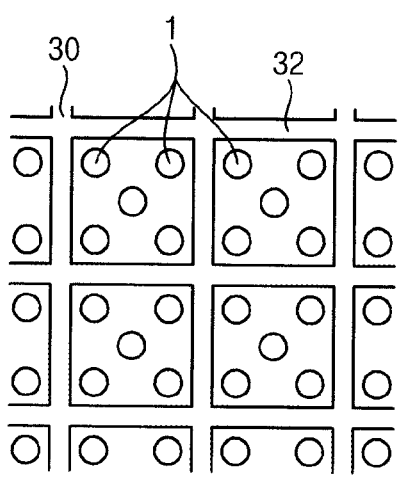
FIG. 8 shows the muntin placed on the light source module in accordance with another embodiment of the invention.

FIG. 7 shows the muntin 30 placed on the light source module 10. The muntin 30 may be adhesively attached to the light source module 10. The reflective walls 32 and the substrate 2 together define a zone. In the embodiment shown, the muntin 30 is designed such that one light source 1 is placed in each zone, approximately near the center. In other words, there is one light source 1 in each zone. This, however, is not a limitation of the invention. As shown in FIG. 8, multiple light sources 1 can be in one zone for cost reduction and control convenience. Moreover, the arrangement of the multiple light sources 1 within each zone can be varied.

Figure 9:
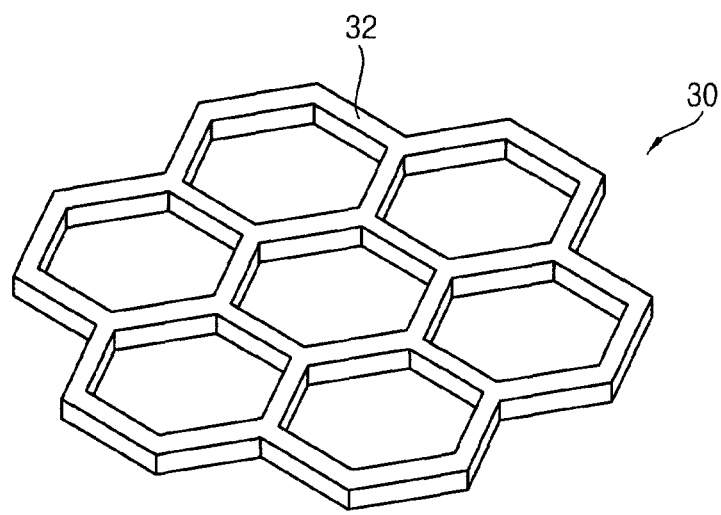
FIG. 9 depicts an example of a muntin with zones arranged in close-packed hexagonal configuration.

One of the side-effects of localizing light is that it may introduce orthogonal cross-talk between zones. One way to reduce this undesirable cross-talk is by using a muntin 30 with hexagonal zones. FIG. 9 depicts an example of a muntin 30 with zones arranged in close-packed hexagonal configuration. The hexagonal muntin 30 may be suitable for embodiments with one light source 1 per zone, as the light source 1 located at the center of the zone would be approximately equidistant from the six walls of the muntin 30, at least more so than the rectangular-zone counterparts described above. The slope of the reflective walls 32 would generally be less steep for hexagonal zones than for rectangular zones. The hexagonal muntin 30 of FIG. 9 may be used with groups of light sources in each zone to keep the locality high while reducing visual artifacts.

Figure 10:
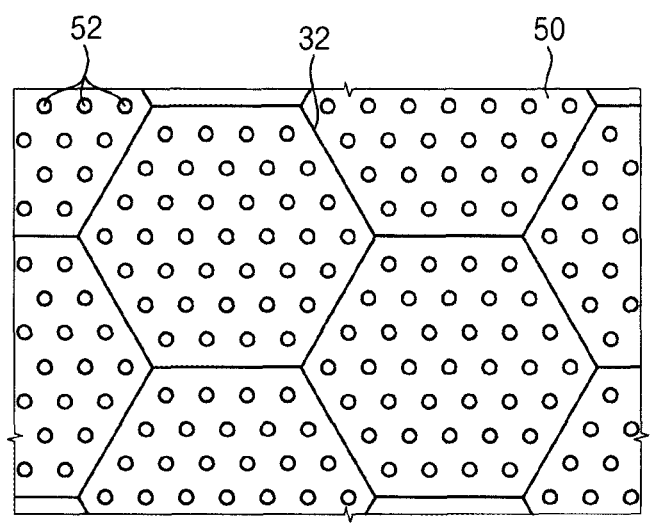
FIG. 10 is a top view of the cavity sheet placed on the muntin.

The zones formed by the reflective walls 32 and the surface of the substrate 2 may be covered with a cavity sheet 50 to form a light-mixing cavity. FIG. 10 is a top view of the cavity sheet 50 placed on the muntin 30. Although the cavity sheet 50 is depicted as though it is transparent, this is done to illustrate the alignment of pinholes 52 with the muntin walls 32 and the cavity sheet 50 is actually a reflective surface. The pinholes 52 may be through-holes or perforation that allow light to exit the light-mixing cavity and propagate toward the optical sheets 60. As shown, the pinholes 52 are arranged on a regular, closed-space grid that ensures that the light that spreads from them to the optical sheets 60 will be evenly distributed with no hot spots from the lower spatial frequencies of the muntins or light sources 1. With the cavity sheet 50, each zone created by the muntin walls 32 acts as a light integration cavity that helps the light to mix and become uniformly distributed. The light source (s) 1 for each light mixing cavity (which corresponds to a zone of the light source module 10) would be controlled separately.

The height of the reflective wall 32 is selected to avoid visual artifacts, such as shadows. The overall dimension of the substrate 2 and the number of light sources 1 in each zone are taken into account in selecting the height of the reflective wall 32. Use of the cavity sheet 50 generally allows the muntin height to be reduced.

The cavity sheet 50 may be integrally formed with the walls, attached to the walls, or be a separate piece that assembles with or rests on the walls. In some embodiments, the cavity sheet 50 and the muntin 30 may be monolithically formed through molding and metallization. The muntin walls contain the light in zones to maintain high locality. The pin holes 52 allow light to exit the integration cavity in a uniform manner. The surface of the cavity sheet 50 that faces the inside of the cavity (the bottom surface of the cavity sheet 50) may be coated with titanium oxide for enhanced reflectivity.

Figure 11:
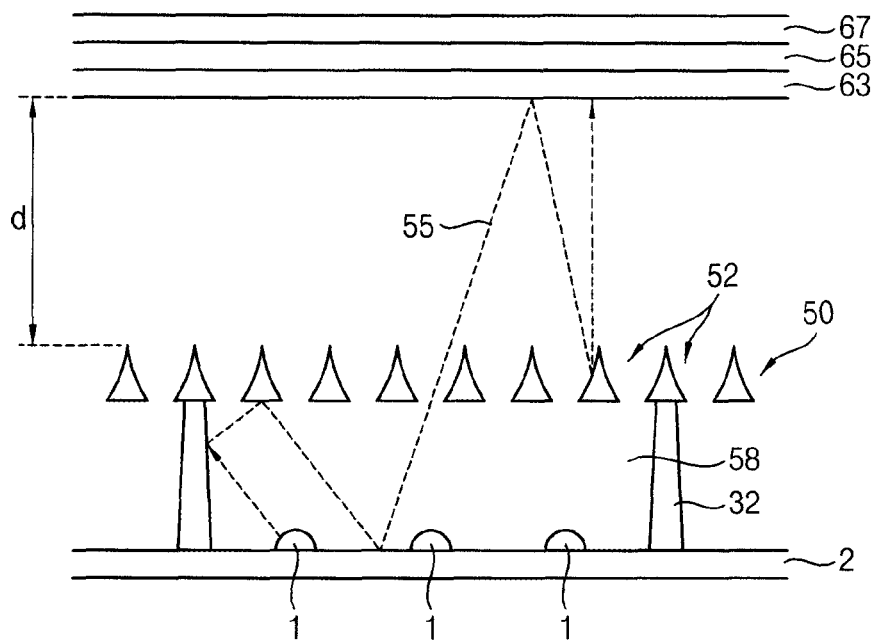
FIG. 11 depicts a cross-sectional side view of a backlight unit including a light mixing cavity.

FIG. 11 depicts a cross-sectional side view of a backlight unit including the cavity sheet 50, and illustrates a light mixing cavity 58. In the cross-sectional view, the pin holes 52 appear as openings in the cavity sheet 50. Light from the light sources 1 reflects off the walls 32 and the bottom surface of the cavity sheet 50 as well as the substrate 2, and gets mixed in the light mixing cavity 58 before exiting through the pinholes. The surface of the substrate 2 may be coated with a reflective material. A broken line 55 depicts an example of a light path. Coming out of the pinholes, the light reaches the optical sheets 60. The optical sheets 60 may be separated from the cavity sheet 50 by a distance d to make room for light to propagate. Light that exits the light mixing cavity 58 through a pinhole 52 propagates across the thickness d, strikes the light recycling sheet 63 to get selectively reflected back to the cavity sheet 50, then gets redirected back toward the light recycling sheet 63 as shown. Where the light recycling sheet 63 is a DBEF, light of certain polarization will enter the optical sheets 60 while light of different polarization state is reflected back to the cavity sheet 50. The higher the number of pinholes 52 and smaller the spacing between them, the smaller will be the distance d between the cavity sheet 50 and the optical sheets 60. The width of the top sections of the reflective walls 32 is such that they fit between the pinholes 52.

In the embodiment of FIG. 11, the light recycling sheet 63 is optional.

In an embodiment where LEDs are about several mm tall, the height of the light mixing cavity 58 may be about 10 mm. The pinholes 52 may have a width of about 0.25-2 mm. The bigger the pinholes 52, the more light will come out of the light mixing cavity 58 but the light that comes out will not be as well-mixed as light coming out of an embodiment with smaller pinholes 52. In one embodiment, there may be about 200 zones in the light source module 10.

Figure 12:
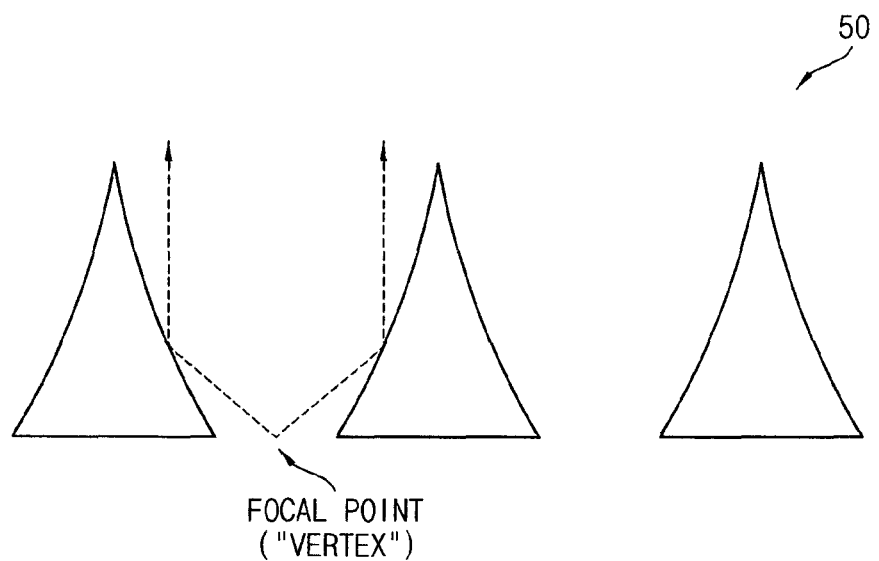
FIG. 12 depicts a cross-sectional side view of an embodiment of the cavity sheet.

FIG. 12 depicts a cross-sectional side view of an embodiment of the cavity sheet 50. In this embodiment, the pinholes 52 are not cylindrical hollow areas of a constant width that extends through the thickness of the cavity sheet 50. Rather, the sidewalls of the pinholes 50 have a parabolic profile to act as parabolic mirrors which ensure that the light is focused toward the optical sheets 60 in a reasonably narrow cone, reducing light spread to distant zones. To maintain high locality, each pin hole is positioned at the focal point of the parabolic reflector formed by its sidewall. The muntin walls 32 contact the parabolic mirror array between the pinholes to eliminate shadows, as illustrated in FIG. 11. Other shapes and arrangements of the muntins 30 and pinholes 52 are possible (e.g., square, rectangular).

The cavity sheet 50 may be made of any injection-moldable material that offers structural strength, light weight, and good dimensional control for fine features (such as pinholes 52). White polystyrene that is metalized (e.g., on the top surface referring to FIG. 11) is an example of a suitable material.

Figure 13:
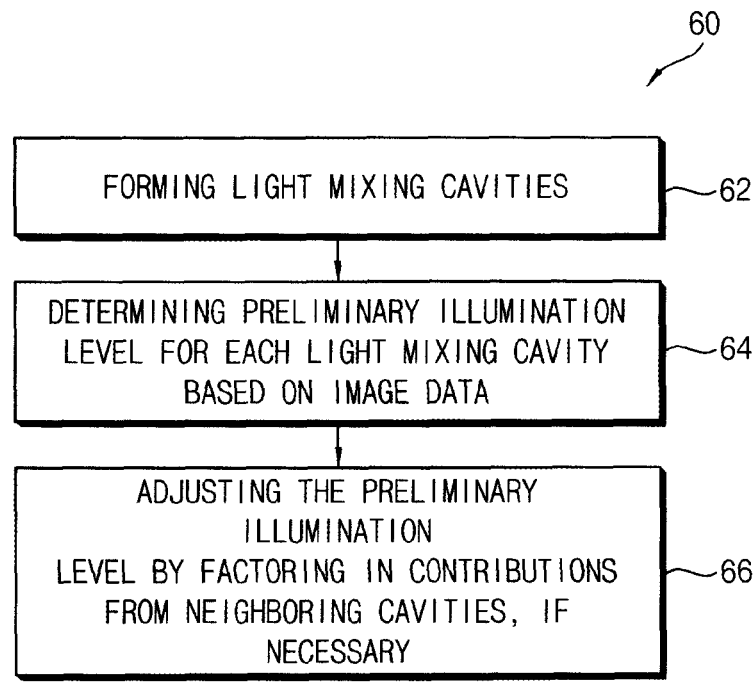
FIG. 13 is a flowchart showing a backlight operation method in accordance with one embodiment of the invention.

FIG. 13 is a flowchart showing a backlight operation method 60 in accordance with one embodiment of the invention. As shown, the method entails forming the light mixing cavities (step 62), for example by assembling the light source module 10, the muntin 30, and the cavity sheet 50 as described above. A preliminary illumination level for each light mixing cavity is then determined (step 64), for example by using the histogram-based method or the peak-value method described below. The preliminary illumination level of cavity c is then adjusted by taking into account the illumination level of neighboring light mixing cavities (step 66). For example, if one of the adjacent light mixing cavities has a significantly higher illumination level than the light mixing cavity c, some of the light may leak into the light mixing cavity c such that the target illumination level can be achieved for cavity c even with a lower illumination level than the preliminary illumination level for the light source 1 in cavity c. If the reflective walls 32 are thick, achieving high localization, the contributions from neighboring light mixing cavities may be insignificant. In such case, the preliminary illumination level will not need much adjustment, if any.

The backlight operation method 60 may be partially or wholly implemented using digital electronic circuitry or a computer including a processor and a memory, along with software and/or firmware. A computer-implemented medium may be a machine-readable storage device, a machine-readable storage substrate, a memory device, a composition of matter effecting a machine-readable propagated signal, or a combination thereof.

Figure 14:
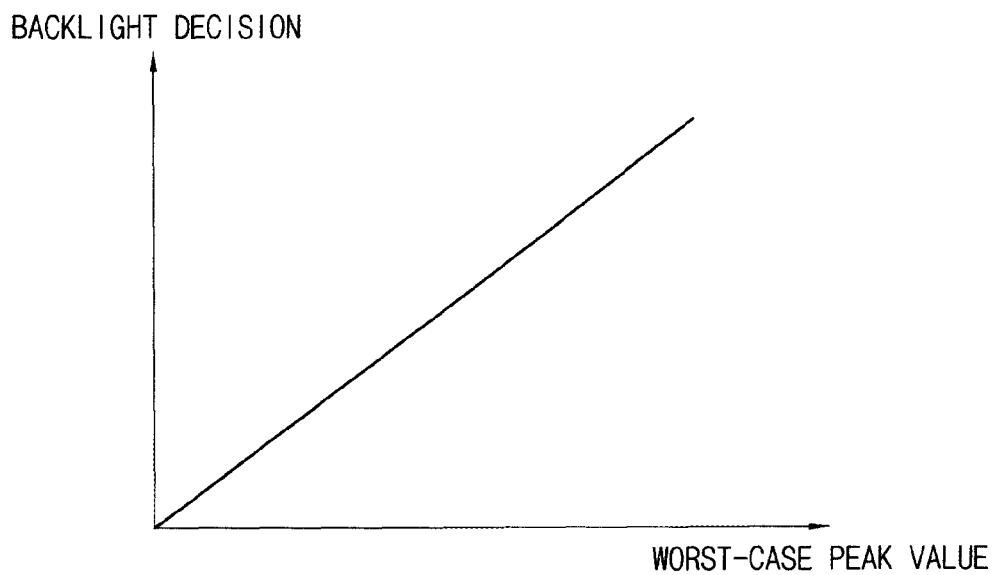
FIG. 14 depicts a peak-value method that may be used with an embodiment of the invention.

FIG. 14 depicts a peak-value method that may be used for DBLC. In utilizing DBLC, the backlight setting is adjusted periodically, for example on a frame-by-frame basis. The peak-value method checks all the pixels in a zone to determine which pixel requires the highest illumination level for proper image display, and sets the illumination level for the entire zone at the level that is required by that pixel. In other words, the peak-value method selects an illumination level that is equal to what is theoretically required for a given frame. With the peak-value method, the illumination level for a frame will not be set higher than is requested by the most demanding pixel. Hence, when there are many images that are "dark" such that the illumination level required by the most demanding pixel is low, the peak-value method offers significant power savings.

Figure 15:
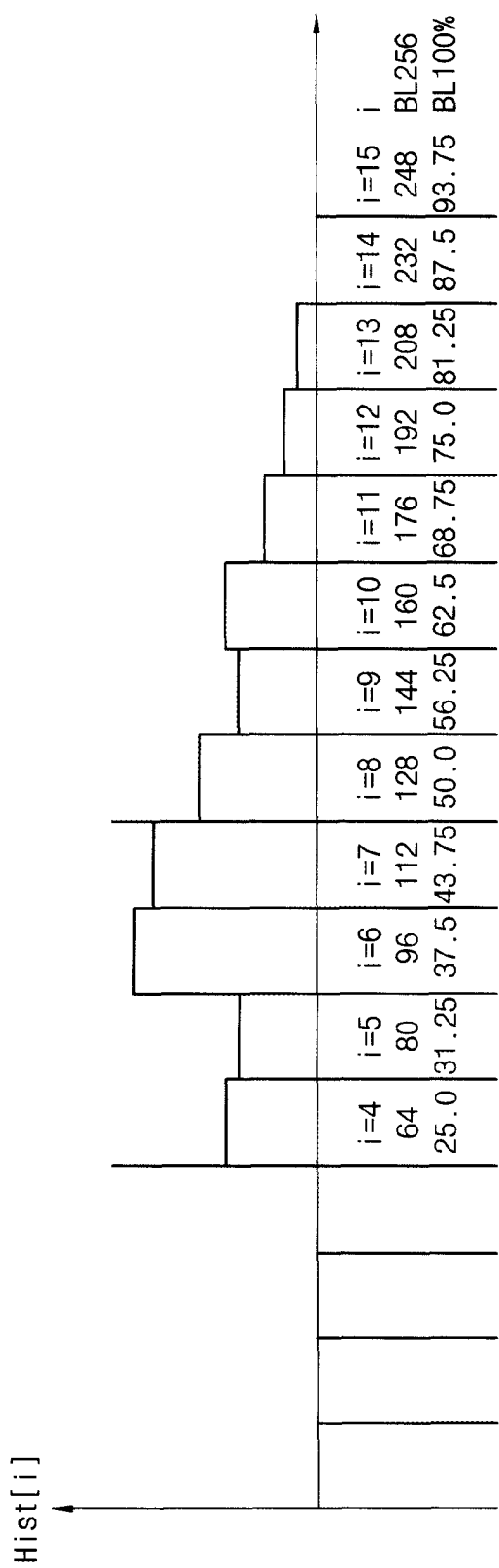
FIG. 15 illustrates a histogram-based method that may be used to determine the illumination level for a zone in accordance with an embodiment of the invention.

FIG. 15 illustrates a histogram-based method that may be used to determine the illumination level for a zone. The histogram-based method may be an alternative to the peak-value method or may be used with the peak-value method, for example if the lower of the two values is chosen. FIG. 15 depicts an example of a histogram with 16 "bins" (labeled i=0 to 15), the bins representing non-overlapping ranges of digital illumination values. The vertical axis in the histogram shows the number of pixels in each bin, and the horizontal axis shows the illumination level. A determination is made as to what level of backlight illumination is requested (or required) by each pixel in a frame. Based on the illumination level requested, each pixel is added to one of the 16 bins in the histogram that has a illumination level range encompassing the illumination level of that pixel. Hence each element, hist[i], aims to store a value proportional to the number of pixels in the given zone that fall within the range of the i-th backlight bin.

In a simple example of a fully red pixel value (i.e. R=255, G=B=0), such a fully red pixel would request/require that the backlight be fully-on. Hence, that pixel would contribute to the count in the highest bin (i=15 in the case of FIG. 15) being incremented by one.

In the histogram of FIG. 15, the bin on the x-axis farthest away from the origin is the bin representing the highest illumination level. The particular backlight used for FIG. 15 has 256 illumination levels, and the highest bin represents illuminations levels 248-256. Although 16 different bins are shown in FIG. 15, this is just an example and the number of bins is variable. In fact, there could be as many bins as discrete illumination levels (256 bins in the case of FIG. 15, each bin representing one illumination level). As each pixel of a zone gets examined, the pixel count in one of the bins gets incremented.

In some embodiments, the counters for the bins could be capped at a certain level (and not provide a full count of all possible image data values in a frame).

In order to fill the bins, a metric that correlates a given pixel value to an illumination value may be used. In one such metric embodiment, the minimum backlight requirement, BL_req, for a pixel being displayed may be considered as proportional to the maximum of its component R, G, B, W values. The channel with the largest value dictates the backlight requirement.

For example, in linear RGBW space, the minimum backlight requirement is proportional to max (R, G, B, W), as follows:

$$BL\_req \; \alpha \; \max(R,G,B,W)$$

As each pixel in a given frame is processed, the minimum backlight requirement of each pixel may be calculated and used to select the appropriate backlight bin and to increment the count value of that bin as follows:

$$\text{backlight bin } i=(BL\_req/\text{maximum backlight value})* \\ (\text{total number of bins}).$$

If current pixel falls within the category defined by backlight bin i, increment the count value of that backlight bin as follows:

$$\text{hist}[i]=\text{hist}[i]+1.$$

As discussed above, each counter for a given bin could be uncapped, or capped at a certain value that gives a meaningful measure of the backlight requirements of the current image to be displayed. In one embodiment, a cap range of 2-5% of the total number of pixels in an image may be reasonable. Other caps are possible.

Although the BL_req equation above gives one exemplary measure of the backlight requirement for a given pixel, other measures are possible. For another embodiment, it is possible to apply color weighting terms—either prior to calculating the minimum backlight requirement or afterwards. For example, the color channels data R,G,B,W may be individually be multiplied by color weighting terms, RWT, GWT, and BWT, consisting of values, e.g. less than 1, so that the backlight requirement of pure colors can be reduced to less than 100%. This method may result in some intentional color luminance drop, yet color weighting may be considered an alternative feature in tuning the DBLC system and algorithm toward more or less aggressive power savings, as is desired.

For example, errors in displaying blue are often difficult for the human visual system to detect. Setting the BWT value to 50% may allow the backlight to drop 50% lower than necessary to correctly display blue pixels. The blue values may then need to be scaled or desaturated to bring them back into gamut but in the case of blue this error may not be very apparent in blue. Red and Green may be scaled by less, by numbers closer to 100%, without introducing unacceptable error.

Moreover, other color (e.g. yellow, magenta, or cyan) weighting term (e.g. YWT, MWT, CWT respectively) may be used to act more or less conservatively, as desired. For example, yellow—which is the brightest of all pure colors and most susceptible to perceived luminance error—may be used to be more conservative. A yellow weight may serve to further raise the value of the red weight and thus raise the backlight requirement when both bright red and bright green are present. As another alternative, a white weighting term, WWT, may be included and may typically be set to unity but may be adjusted to slightly less than 1 for aggressive settings that may allow some loss in peak white luminance in order to achieve illumination levels less than 50%. Thus, in one embodiment, the resulting color weighting expressions (given in linear RGBW space) and backlight requirement calculation may be as follows:

$$R=R*(RWT+(YWT-RWT)*G) \text{ (where } YWT>=RWT)$$

$$G=G*GWT$$

$$B=B*BWT$$

$$W=W*WWT.$$

In some embodiments, the LED power level is not allowed to be set below 25%. In such cases, the lower 4 bins may not be implemented.

The counters in the histogram may have a fixed number of bits (typically 14) and thus may not count higher than $(2^{14}-1)$ or 16,383. When a histogram counter reaches this limit, it stops counting and holds the maximum value. This maximum count is referred to as a "cutoff" in the pseudo code implementations. The histogram threshold THH1 is a number between 0 and this cutoff A THH1 value set at 0 is conservative and will tend to choose a high backlight value. A higher THH1 value is more aggressive and will tend to choose a lower backlight value to save more power. A full bin may stop the search and set the power level.

To determine the illumination level according to the histogram-based method, a backward traversal method may be applied to the histogram. In a nutshell, during the backward traversal, the bin (i=15) representing the highest illumination level is first examined to see how many pixels fall in that bin. If the pixel count in the highest bin (i=15) is below a threshold number, the number of pixels that were in the highest bin (i=15) is added to the next highest bin (i=15), and the total pixel count in the second highest bin (i=15) is examined. If the total pixel count in the second highest bin (which is the combined number of pixels from what was in the highest bin and the second highest bin) is still below the threshold number, then all the pixels in the i=15 bin are added to the next highest bin (i=14) and the third highest bin (i=14) is examined. This process is continued until the threshold number is reached.

Figure 16:
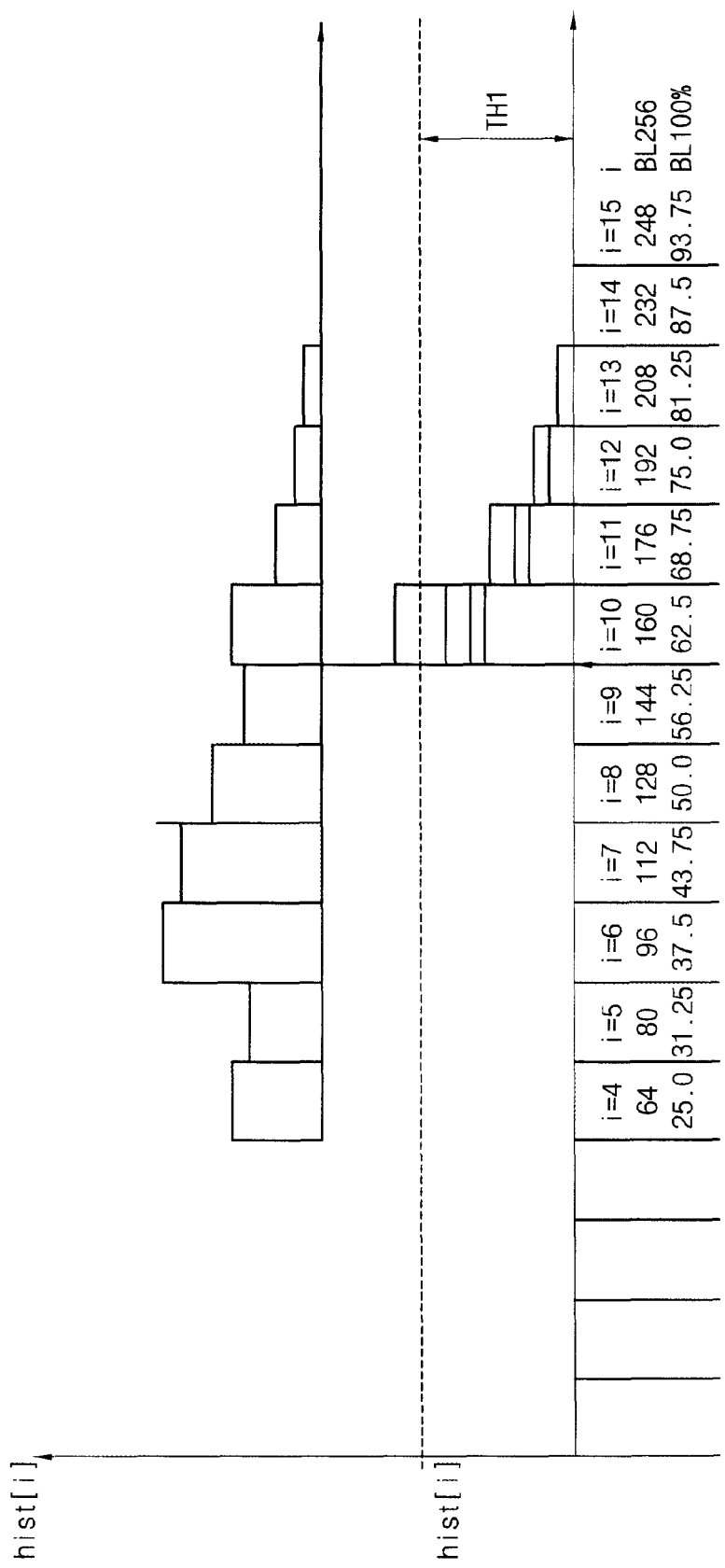
FIG. 16 depicts an embodiment of the process for determining an illumination level for a zone.

FIG. 16 shows an error function E_sum that may used in accumulating the amount of perceived luminance error that might be introduced if one were to progressively disregard the backlight power requirements of each power bin starting, for example, from the bin representing the highest backlight power requirement category and continuing through to the bin representing the lowest backlight power requirement category. Alternatively, an accumulation of reducing error could be maintained and processed from the bin of least backlight power requirement and continuing to highest until the error is reduced below a certain threshold. The traversal is preferably done after the end of the current frame.

In the case of backwards traversal from the highest power requirement bin of the histogram, if the perceived accumulated error E_sum[i] associated with a particular bin exceeds an acceptable error threshold TH1, then the associated backlight requirements of that bin is preserved and the backlight decision is therefore deduced from the that bin.

In one embodiment, the perceived accumulated error function E_sum[i] may take into account the number of pixels that would be compromised if the traversal were to continue to the next lowest power bin. Additionally, it may also include a multiplicative compound factor (typically greater than 1) to represent the non-linear escalation of perceived error as one traverses to lower backlight bins.

In the particular example of FIG. 16, there are no pixels in either bin i=14 or i=15. Thus, it is safe to reduce the illumination level to at least digital value 232 (out of a possible 255 in this example) without any visual error induced. Now, starting with bin i=13, a small number of pixels sampled are requesting or requiring a level of backlight somewhere in that bin—somewhere between digital values 208 and 231 in this example. As is seen, the level of error is below the threshold, so the BL Decision module 110 continues considering even lower backlight power possibilities, moving on to bin i=12. The BL Decision module 110 continues in this fashion until bin i=10, when the error threshold TH1 is finally exceeded. The highest bin that exceeds the error threshold is herein referred to as the "critical bin." The backlight illumination level, thus, is set at a value between 160 and 175.

Once the critical bin is identified, there are different ways to select the exact backlight value from the range that is covered by the critical bin. In one embodiment, the backlight power may be selected to match the highest level in the selected bin (bin i=10), which in this example is digital value 175. While this may be a "safe" choice in terms of error, it may be possible to be a little bit more aggressive in terms of power savings.

Alternative ways of determining the illumination level for a zone in a frame are disclosed, for example in U.S. Patent Application Publication No. 2011/0025592, which is incorporated by reference herein.

The adjustment process in step 66 of the flowchart in FIG. 13 will be described in reference to FIG. 17 through FIG. 24.

Figure 17:
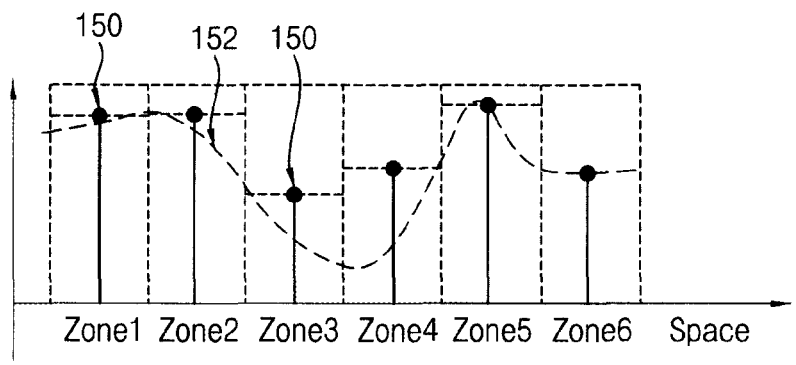
FIG. 17 illustrates a digital processing system where the illumination level in each zone is derived from the maximum channel value.

FIG. 17 illustrates a digital processing system where the illumination level in each zone is derived from the maximum channel value. As shown, each zone has a maximum channel value 150, which is the maximum illumination level that would be required to properly display the image corresponding to that zone. Usually, the maximum channel value depends on the illumination level required by the most-demanding pixel in that zone. The broken curve 152 that extends across the plot shows the illumination level across the zones that would display the image properly. As shown, setting the backlight drive value for each zone to maximum channel value can result in an effective illumination level that is higher than what is needed to produce a high-quality image.

Figure 18:
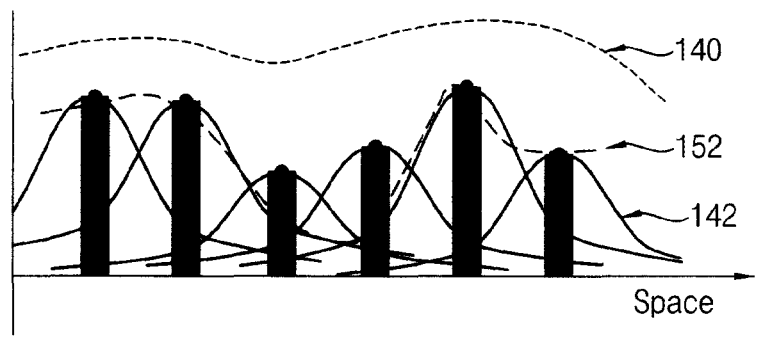
FIG. 18 shows the effective illumination level that results from the individual point-spread function of the backlights in each zone.

The reason for the illumination level ending up higher than needed is because light from a light source 1 spreads, illuminating not just its own display zone but also contributing to the illumination of the neighboring display zones. Although the muntin 30 controls this spreading to some degree, perfect control is difficult to achieve. FIG. 18 shows the effective illumination level 140 that results from the individual point-spread function 142 of the backlights in each zone. Light from a light source 1 propagates such that it "spreads" with increasing distance from the source, resulting in a point spread function (PSF). When each zone is set to its maximum channel value and also receives "overflow" illumination from the backlights of the neighboring zones, the combined effect is a higher illumination level than what is needed.

Each zone receives light from its own light source 1 and also from neighboring zones that contribute to the luminance of the given zone. A "neighboring" zone includes but is not limited to an immediately adjacent zone. For example, depending on the size of the zones and the point spread function of the light sources 1, a zone that is multiple zones away can contribute to the illumination of a zone.

A recursive technique for minimizing light source drive values in a display system that implements local dimming, such as the one that is described in U.S. patent application Ser. No. 13/107,745, may be used in step 66. This local backlight optimization process is based on a number of concurrent processes, the number equaling the total number of zones whose drive values are to be optimized. Each process keeps track of the total current backlight of all the spreading functions at one or more points in a given backlight zone. Each process also keeps track of the difference ($\Delta$) between the current backlight illumination level and the target backlight illumination level.

Figure 19:
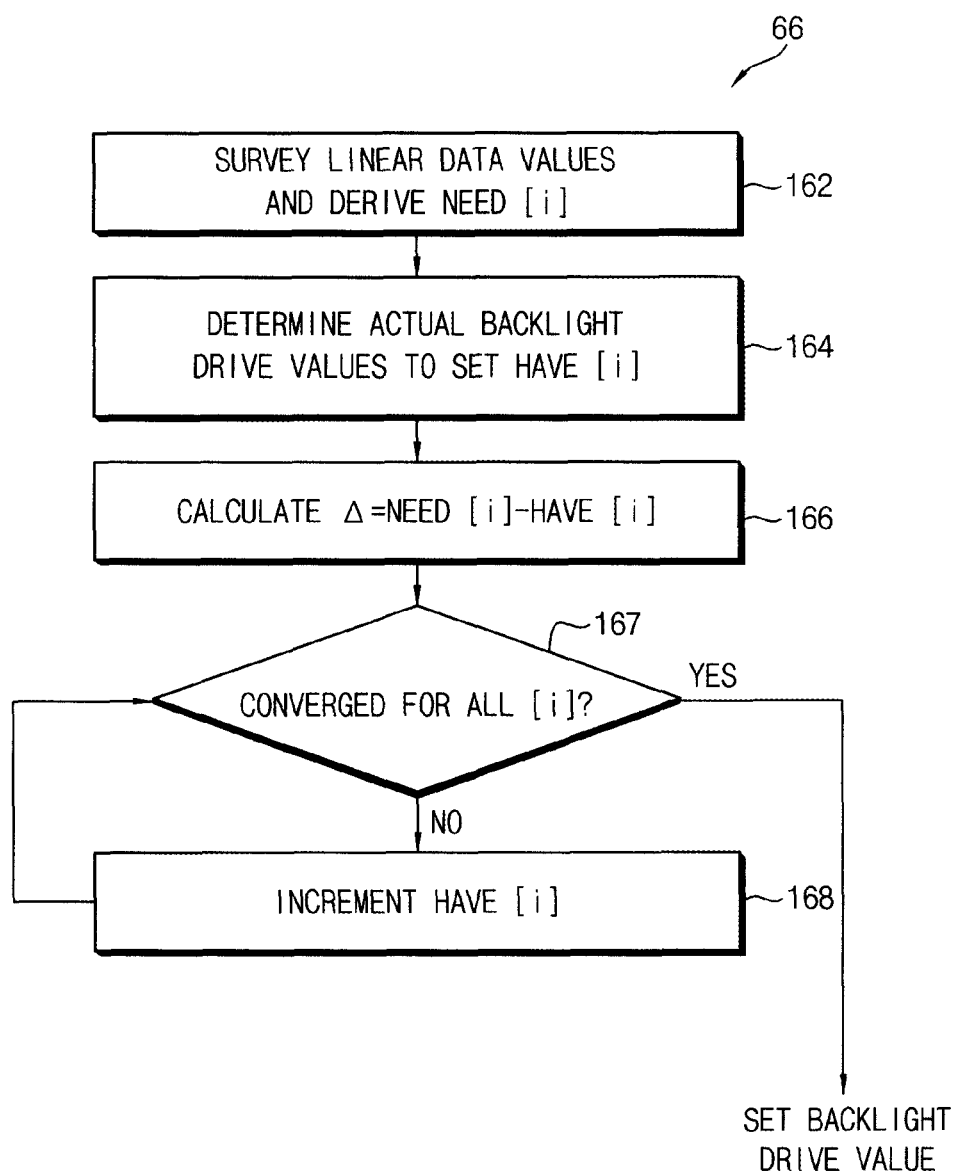
FIG. 19 depicts the local backlight adjustment process in accordance with the invention.

FIG. 19 depicts the local backlight adjustment process 66 in accordance with the invention. The optimization process 66 begins with a survey of linear data values that are fed to the display panel. During the survey, a determination is made as to what level of backlight illumination is requested or required by each pixel in a zone. Based on this determination, the required illumination level for each zone is derived, and set equal to need[i], "i" indicating a particular zone (step 162). In one embodiment, the peak channel value for each zone may be used as the required illumination level. In determining the need[i] value for a zone, most methods that are used for global dimming may be applied to each zone, by treating each zone as the entire backlight. For example, the histogram-based illumination level selection technique described above may be used to set the need[i] value for a zone.

The current illumination level at each zone is surveyed as well, and set to have[i] (step 164). The LEDs are characterized, and each LED drive value has a PSF associated with it. Hence, have[i] value may be determined through mathematical modeling based on the drive values.

The difference ($\Delta$) between need[i] and have[i] is calculated (step 166) and checked for convergence (step 167). Depending on the implementation, the condition of "convergence," as used herein, may be deemed to be satisfied if a preselected number of iterations have completed, if $\Delta$ is less than a preset amount, or if $\Delta$ keeps bouncing back between two values (e.g., +1 and −1). If the convergence condition is not satisfied, have[i] is incremented again (step 68) and the iterative process continues until the processes converge to optimum backlight drive values that meet or exceed the desired effective backlight targets for all the zones i.

An "incrementation," as used herein, may be done by a positive amount or a negative amount (i.e., it includes decrementation). Typically, if need[i]>have[i], the backlight drive value is incremented by a positive amount to get have[i] closer to need[i]. On the other hand, if need[i]<have[i], the backlight drive value is incremented by a negative amount. In addition, in making the decision in step 68, each zone takes into account the state that their neighboring zones are in. For example, a zone increments the backlight drive value if its neighboring zones have reached 100% of their drive values and have still not reached their target luminance (i.e., the neighbors are "exhausted"). Hence, even if the $\Delta$ value for that zone is already smaller than the preset value and its own needs are satisfied, its backlight drive value may still get incremented to help its neighbor(s). Each process for a zone "i" can consider the data values of all the other processes and independently make a decision as to whether to increment its associated backlight driving value up or down. In one embodiment, the values need[i] and have[i] are represented in nits or candelas.

Each incrementing of the value is usually done by a small preset magnitude. However, a multiplicative gain factor may also be used to increment the drive values up or down. Alternatively, the magnitude of the increment amount can be dynamically adjusted (instead of being a constant present amount) to speed up the rate of steady state convergence. Small increments are preferred when trying to minimize oscillatory behavior. Such small increment magnitudes can be thought of as high dampening factors on the recursive processes.

Figure 20:
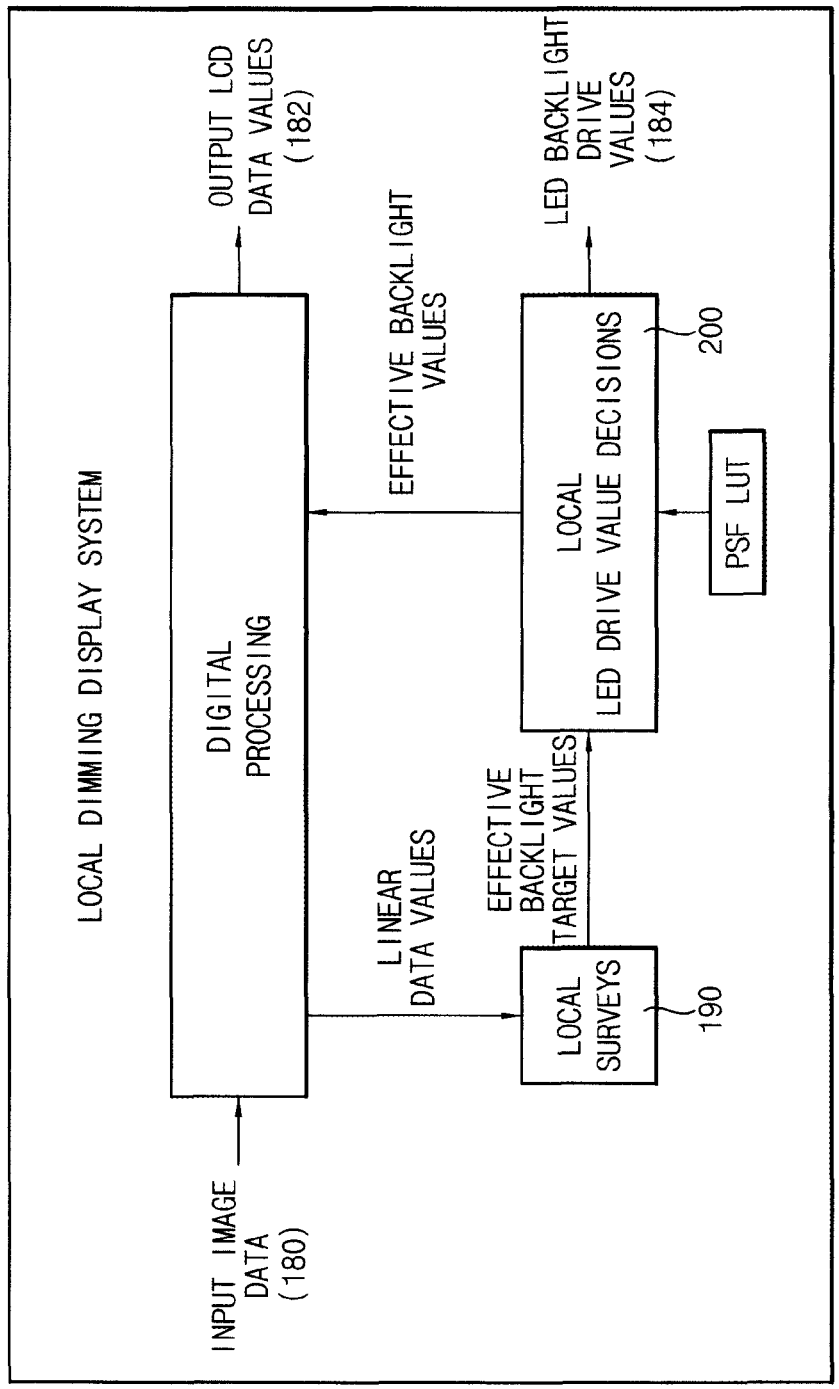
FIG. 20 illustrates a digital processing system for a display system implementing local dimming.

FIG. 20 illustrates a digital processing system for a display system implementing local dimming. Image data 180 is fed to the system and goes through two processes: 1) a process to output LCD data values 182 for the display panel, which is described in more detail below in reference to FIG. 24, and 2) a process to output backlight drive values 184 for the backlight. After the image data 180 is converted to linear data values, it goes through the survey block 190. As described above, the survey entails deriving the target illumination level (or need[i]) for each zone i based on the linear data values. The target value is then provided to the backlight decision block 100, which calculates $\Delta$=need[i]−have[i] and determines whether to increment the backlight drive value for each zone "i" as described above in reference to FIG. 19.

As shown, the effective backlight values (i.e., the illumination levels) that are determined in the LED Drive Value Decision block 200 are fed back into the Digital Processing block. The Digital Processing block uses the backlight information to control the valve/shutter of the pixels in the display panel. The degree of brightness displayed by a pixel depends on both the illumination level of the backlight and how much of the light is transmitted through the valve/shutter of the pixels. For example, in the case of an LCD, the orientation of the liquid crystal molecules acts as the valve/shutter and determines the amount of light transmission. Hence, to achieve the same level of brightness, the display system can use a high backlight illumination level and use the shutter/valve to let through a portion of it, or use a lower backlight illumination level and open the shutter/valve wider to let more of the backlight through. The Digital Processing block sets the shutter/valve to achieve the desired level of brightness in the ultimate image that is shown, taking into account the effective backlight values.

Figure 21:
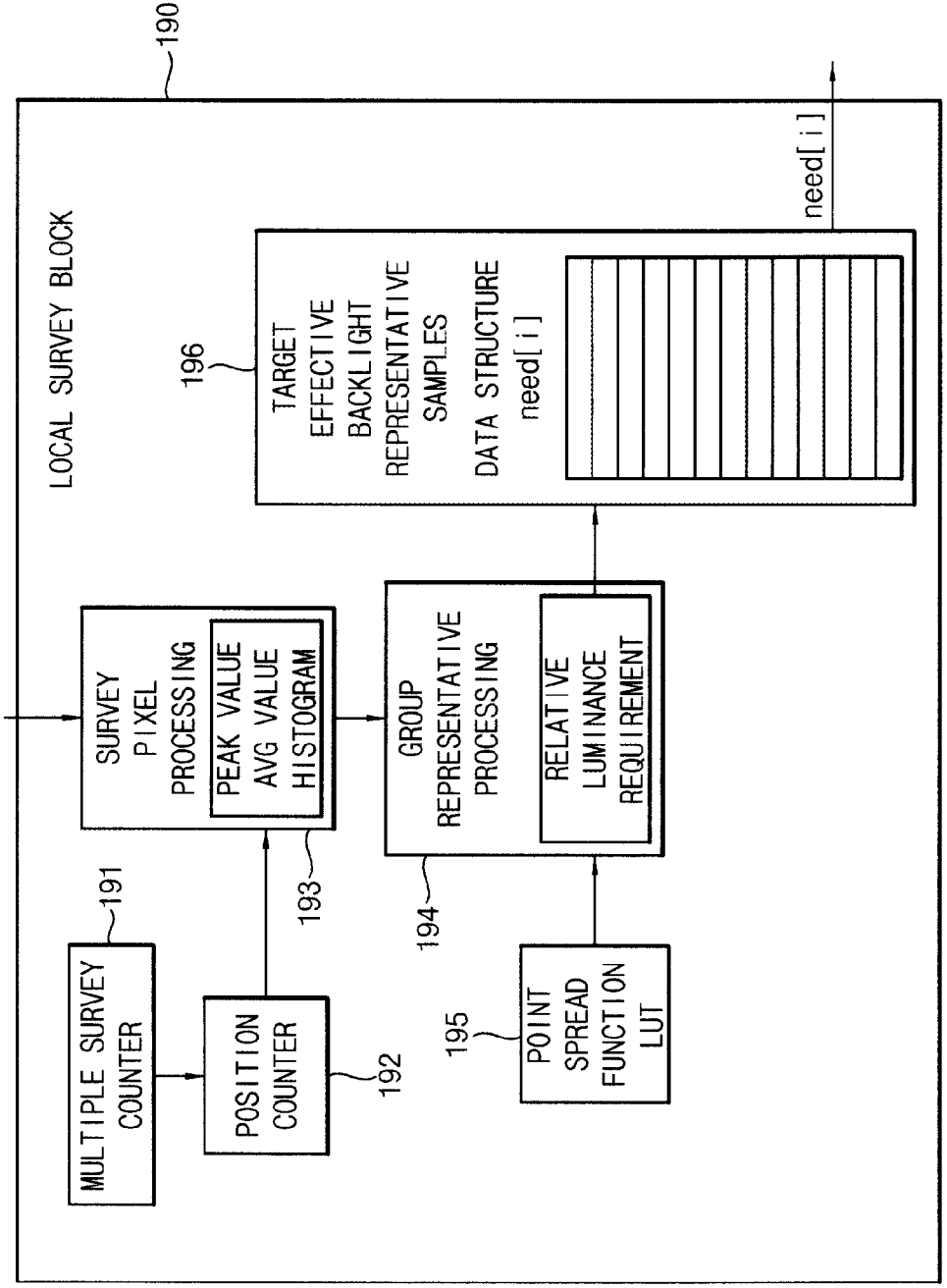
FIG. 21 is a schematic illustration of a survey block.

FIG. 21 is a schematic illustration of the survey block 190. As shown, a survey counter 191 and position counter 192 track which pixels are being accounted for in each zone. Then, Survey Pixel Processing block 193 surveys the pixels in a zone to determine the target illumination level (need[i]). Target illumination level can be set to a peak value (the luminance level requested by the most demanding pixel), an average value of the luminance levels requested by all the pixels in the zone), or a value derived using the histogram method disclosed above. Then, Group Representative Processing block 194 scales each target that is set in the Survey Pixel Processing block 193 to see if any zone is being asked to provide an illumination level that it is not capable of providing. In making this determination, the data from the Position Counter 192 and a PSF LUT 195 are used because how much help a particular zone can get from its neighboring zones depends on its position. For example, a zone that is at or near a center of a backlight has many neighbors that it can get help from. However, a zone that is at a corner of the backlight may only have a few neighbors that can contribute to its illumination. Hence, the preliminary target value that is received from Survey Pixel Processing block 193 may be adjusted up for a zone that is at a corner, while it may be adjusted down for a zone near the center to produce what is herein referred to as the relative luminance requirement.

Using the relative luminance requirements, the Target Backlight Data Structure 196 for need[i] is populated. During this process, each zone may be further subdivided into subdivisions to enhance the accuracy of the illumination adjustment. For example, with six zones, each zone can be divided into two subdivisions such that there will be twelve subdivisions (e.g., [i] would have [$i_1$] and [$i_2$]). The statistical data extracted from every subdivision constitutes a "survey." "Effective backlight," as used herein, is the illumination level.

Figure 22:
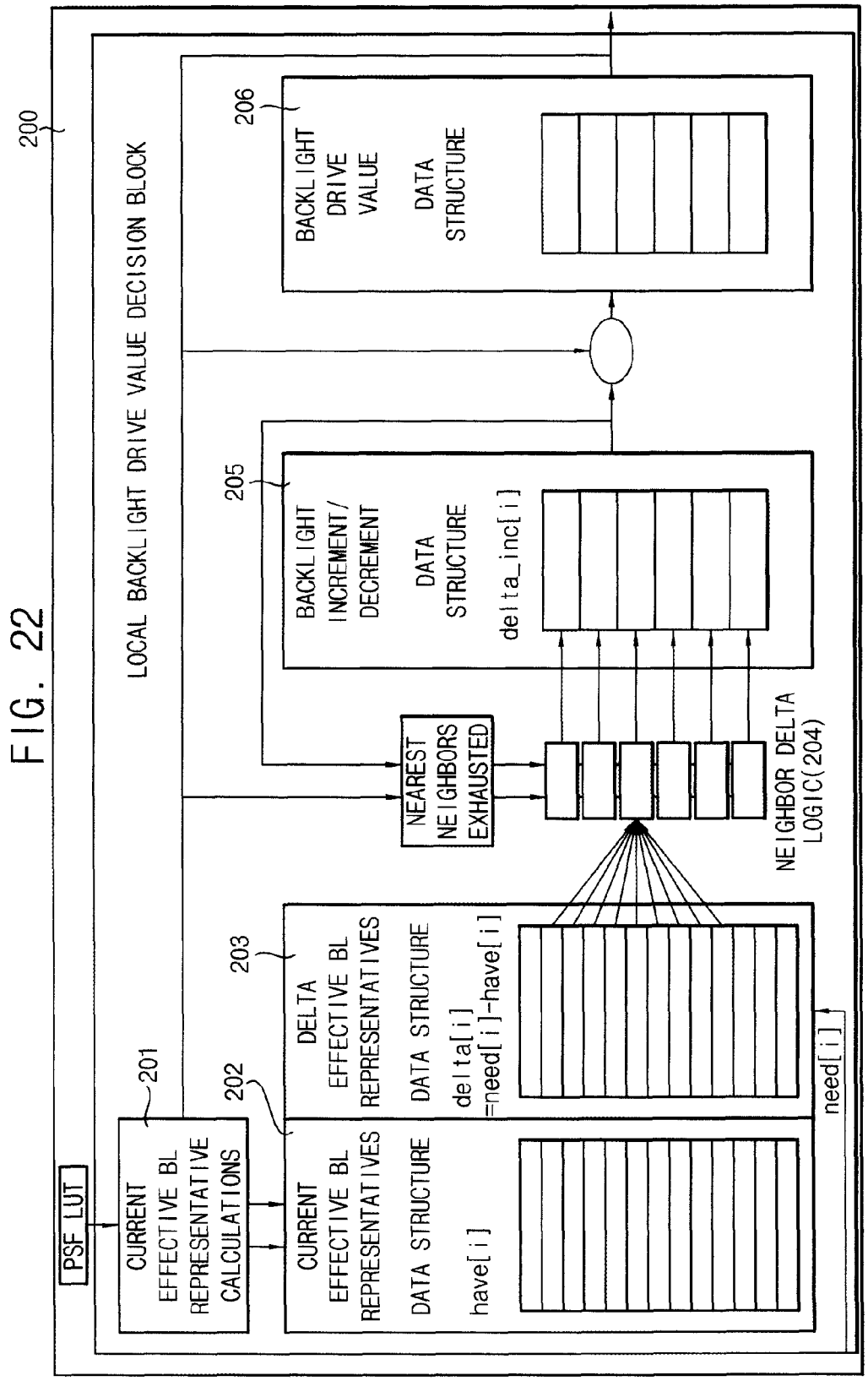
FIG. 22 is a schematic illustration of a backlight decision block.

FIG. 22 is a schematic illustration of the backlight decision block 200 shown in FIG. 20. As shown, a data structure 202 is populated with have[i] values for all the zones, wherein the have[i] values are received from an Effective Backlight Calculation block 201 that calculates the illumination level based on backlight drive values and PSF. A Delta Effective Backlight block 203 receives the need[i] values from the Target Backlight Data Structure 196 to calculate the Δ[i] values for all the subdivisions. The Δ[i] values are condensed back into six zones with neighbor contributions taken into account, in Neighbor Delta Logic block 204. Then, the increment amount for each zone is set in a Backlight Increment Data Structure 205. Using this data, a Backlight Drive Value Data Structure 206 is populated, so that a driving value is set for each zone i. In one embodiment, the backlight drive value decision block of FIG. 22 operates prior to the beginning of the next frame during the vertical back porch, or the dead time between frames.

Figure 23:
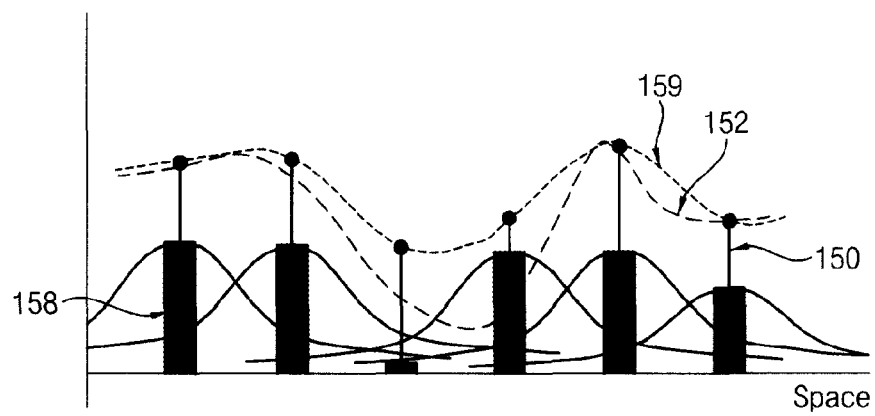
FIG. 23 illustrates an example of backlight drive values after the adjustment process has been executed.

FIG. 23 illustrates an example of backlight drive values after the adjustment process 66 has been executed. The figure shows optimized light source drive values 158 (shown by thick bars) in addition to the overall target illumination level 152 and the maximum channel values 150 (shown by thin bars) that were shown above in FIG. 18. The optimized light source drive values 158 are lower than the maximum channel values 150. The optimized illumination level 159 is closer to the target illumination level 152 than the effective illumination level 140 that would have resulted by setting all the zones to the maximum channel values 150. FIG. 23 demonstrates that power savings can be achieved without compromising image quality, since the target illumination level 152 can be reached with lower drive values when neighbor contributions are taken into account.

Figure 24:
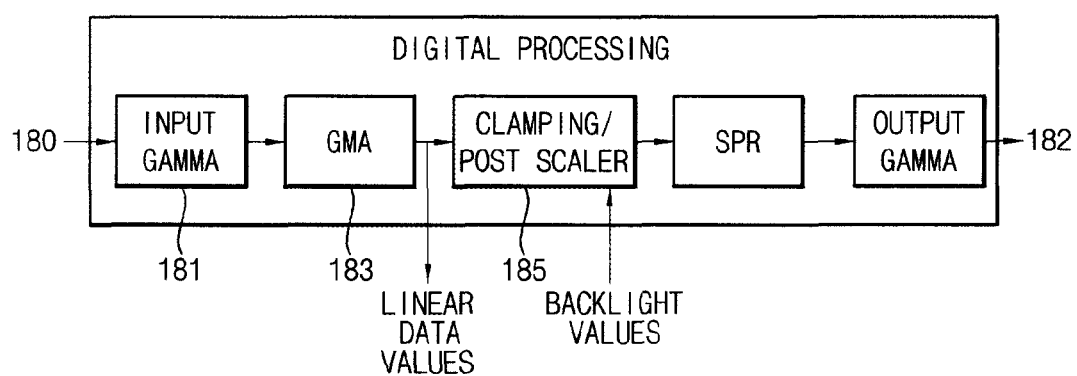
FIG. 24 is a schematic illustration of an exemplary embodiment of the Digital Processing block.

FIG. 24 is a schematic illustration of an exemplary embodiment of the Digital Processing block of FIG. 20. The image data 180 (e.g., RGB input) is fed into an Input Gamma block 181 to get linearized. Usually, the linearization process uses an input gamma LUT. The input gamma block 181 may be omitted if the display is of the type that does not need a gamma conversion. Input gamma block 181 may also introduce some dithering on the input side of the data pathway. The output from the Input Gamma block 181 goes into a gamut mapping (GMA) block 183, which transforms the receive data specified as an RGB primary color set to a multi-primary set of colors. A "multi-primary" display uses four or more non-coincident color primaries (e.g., RGBW, RGBY, RGBC, RGBCW). There are well-known gamut-mapping techniques that may be used for the gamut mapping block 183. The gamut-mapped image data values produced by the gamut mapping block 183 may then be fed to a clamping block 185. The RGBW modified image data may contain out of gamut (OOG) colors whose red, green, or blue value may exceed the maximum allowable value. "Clamping" refers to a technique of forcing a value that is out of gamut back into an acceptable range. If, after gamut mapping, the R, G, B color values are out of gamut, the scaling/clamping block 185 clips the value to ensure that all final values are within gamut. Scaling/clamping is done carefully to cause minimum change to the hue. An exemplary clamping technique that may be used here is described in U.S. Pat. No. 7,893,944.

After clamping, the in-gamut values may enter a Sub-Pixel Rendering (SPR) block 186. If the display panel contains a novel subpixel repeating group, such as what is described in U.S. Pat. Nos. 7,876,341, 7,701,476, or 7,583,279, subpixel rendering would be applied to convert the data to the particular subpixel layout. The data may then be processed in an optional output gamma block 187 before being output as backlight drive values 184.

Although systems and methods of dynamic backlight control in a display system have been described with reference to the specific embodiments, they are not limited thereto. For example, it will be appreciated that any other known data structure may be suitable for the purposes of controlling the backlight and light valve system and that the scope of the present invention should not be so limited to a histogram or the particular form and use of the histogram as presently discussed. Therefore, it will be readily understood by those skilled in the art that various modifications and changes can be made thereto without departing from the spirit and scope of the present invention defined by the appended claims.

What is claimed is:

1. An apparatus for controlling light propagation, comprising:
 a muntin including reflective walls arranged to form a plurality of openings, the muntin being configured to assemble with an array of light sources; and
 a cavity sheet resting on the reflective walls, wherein the cavity sheet has a plurality of pinholes having curved sidewalls in a cross-sectional view, the cavity sheet being configured to assemble with the muntin such that the reflective walls align with areas between the pinholes, wherein the curved sidewalls form a parabolic reflector and an opening is located at a vertex of the parabolic reflector.

2. The apparatus of claim 1, wherein the reflective walls are sloped.

3. The apparatus of claim 1, wherein the reflective walls are curved.

4. The apparatus of claim 1, wherein the openings are rectangular.

5. The apparatus of claim 1, wherein the openings are hexagonal and the walls form a close-packed hexagonal configuration.

6. The apparatus of claim 1, wherein the cavity sheet rests on the muntin and the reflective walls contact the cavity sheet.

7. The apparatus of claim 1, wherein the muntin is made of a white plastic sheet.

8. The apparatus of claim 1, wherein the cavity sheet is made of metalized white polystyrene.

9. A backlight unit comprising a plurality of light mixing cavities wherein each of the light mixing cavities includes a light source surrounded by a reflective wall and a ceiling placed on the reflective wall, the ceiling having pinholes with curved sidewalls in a cross-sectional view through which light exits, wherein the pinholes comprise parabolic sidewalls extending through the ceiling and a through-hole at the vertex of the parabolic sidewalls.

10. The backlight unit of claim 9, wherein the reflective walls are curved.

11. The backlight unit of claim 9, wherein the reflective wall has a slope.

12. The backlight unit of claim 9, wherein the light source of each of the light mixing cavities is controlled individually.

13. A display device comprising:
a light source module having a substrate and a plurality of light sources;
a muntin on the light source module, the muntin having reflective walls that surround the light sources to form discrete zones, wherein the light sources in the discrete zones are controlled separately from other zones;
a cavity sheet disposed on the reflective walls, the cavity sheet covering the zones to form light-mixing cavities, the cavity sheet having pinholes through which light exits;
optical sheets placed on the cavity sheet; and
a display panel placed on the optical sheets.

* * * * *